United States Patent [19]

Fujino et al.

[11] Patent Number: 4,734,814
[45] Date of Patent: Mar. 29, 1988

[54] PLURAL DISK CARTRIDGE ARRANGEMENT

[75] Inventors: Toyomi Fujino, Kanagawa; Norio Hasegawa, Chiba, both of Japan

[73] Assignee: Sony Corporation, Tokyo, Japan

[21] Appl. No.: 933,886

[22] Filed: Nov. 24, 1986

[30] Foreign Application Priority Data

Nov. 30, 1985 [JP] Japan .......................... 60-185286[U]

[51] Int. Cl.⁴ ...................... G11B 23/03; G11B 17/22; G11B 17/02; B65D 85/30
[52] U.S. Cl. ..................................... 360/133; 360/98; 206/444; 369/192; 369/194
[58] Field of Search .................. 360/98, 133; 369/192, 369/194; 206/444

[56] References Cited

U.S. PATENT DOCUMENTS

4,614,474  9/1986  Sudo ........................................ 360/98
4,655,344  4/1987  Ackeret .................................. 206/444
4,655,345  4/1987  Drake et al. .......................... 206/444

Primary Examiner—Robert S. Tupper
Attorney, Agent, or Firm—Hill, Van Santen, Steadman & Simpson

[57] ABSTRACT

In a disk cartridge for charging therein a plurality of disks so that the disks are stacked therein, slide tabs for removing a desired disk are slidably provided along disk discharge and charge directions, and click engaging portions for temporarily locking the slide tabs at a predetermined positions along a sliding direction are offset by a predetermined amount along the sliding direction between the stages so as not to be aligned vertically along disk storage stages, thereby reducing a load of a drive mechanism for aligning the slide tabs at the side of the apparatus body.

5 Claims, 9 Drawing Figures

PLURAL DISK CARTRIDGE ARRANGEMENT

BACKGROUND OF THE INVENTION

1. Field of the Invention

The present invention relates to a disk cartridge for charging therein a plurality of disks, e.g., digital audio disks and mounted to a reproducing apparatus having an auto changing mechanism or the like.

2. Description of the Prior Art

Prior to this application, we have previously filed an application relating to a disk player capable of reproducing disks in sequential and random modes in addition to a normal mode by employing a disk cartridge in which a plurality of disks such as digital audio disks or video disks (U.S. application No. 739,435, filed on May 22, 1985 now U.S. Pat. No. 4,701,900) is charged.

In a disk cartridge used in the disk player disclosed in this previous application, a case body is provided with a disk insertion opening at its front surface and partition members for partitioning at intervals each slightly larger than the thickness of a disk are provided to form shelf-like spaces for storing a plurality of disks.

In each disk storage space, a leaf spring extends inwardly in the storage space to bias a disk toward a side wall opposite to the disk insertion opening so that the inserted disk will not pop out outside the case by an external force such as an impact upon the case. When a disk is inserted, the peripheral edge of a disk passes beyond the leaf spring and the disk is pushed in to a storage position.

Push members for pushing disks toward the disk insertion opening to discharge the disks are provided on the side wall opposite to the disk insertion opening of the cartridge. The push members are integrally formed with slide tabs for operation extending outwardly from the side wall surface of the case body and are slidable in an insertion/removal direction.

When such a disk cartridge is mounted to a player, a desired disk is discharged from the case body by operating the above slide tabs and returned in its original position at the end of reproduction.

Since the original position is detected by position detection of a slide tab which is operated, the slide tab must be located at either a discharge or storage position so as not to be erroneously operated. However, in a player for an automobile, a slide tab corresponding to a storage space storing no disk originally or a slide tab corresponding to a storage space from which a disk was removed for playback is free, so that the slide tab is sometimes moved from correct positions by the inclination, acceleration, or vibrations to the player to cause detection errors.

Therefore, it is preferred to provide a click mechanism (a structure wherein a resistance along a sliding direction is locally increased) for holding a slide tab at its discharge and storage positions, respectively. However, when 10 or more disks are charged in the cartridge, a load of the click mechanism is so increased that an auto reset mechanism for resetting the above slide tab at its storage position may not correctly operate.

SUMMARY OF THE INVENTION

It is an object of the present invention to eliminate the above problem, i.e., not to increase a total click load of all slide tabs when a click mechanism is provided to each slide tab.

Figure 1:
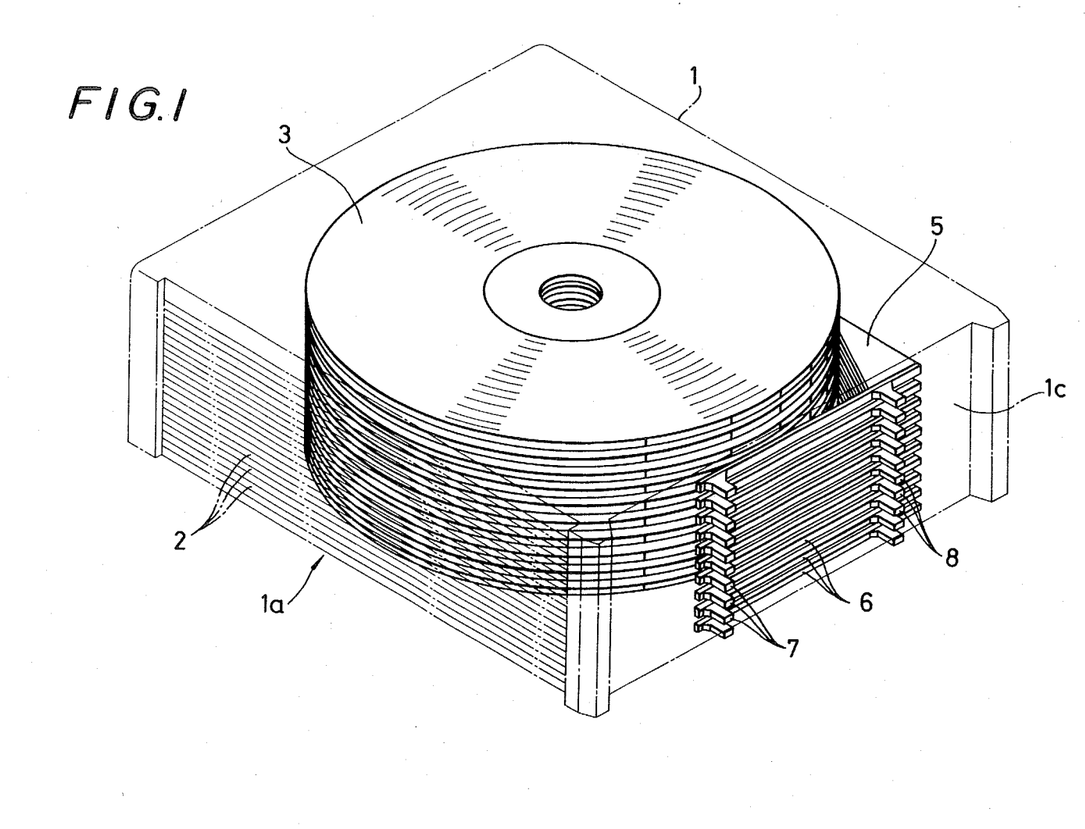
FIG. 1 is a perspective view of a disk cartridge to which the present invention is applied.

In order to achieve the above object, a disk cartridge according to the present invention is partitioned in a multistage manner at intervals each substantially corresponding to the thickness of a disk 3 by shelf-like partition plates, as shown in FIG. 1.

Figure 2:
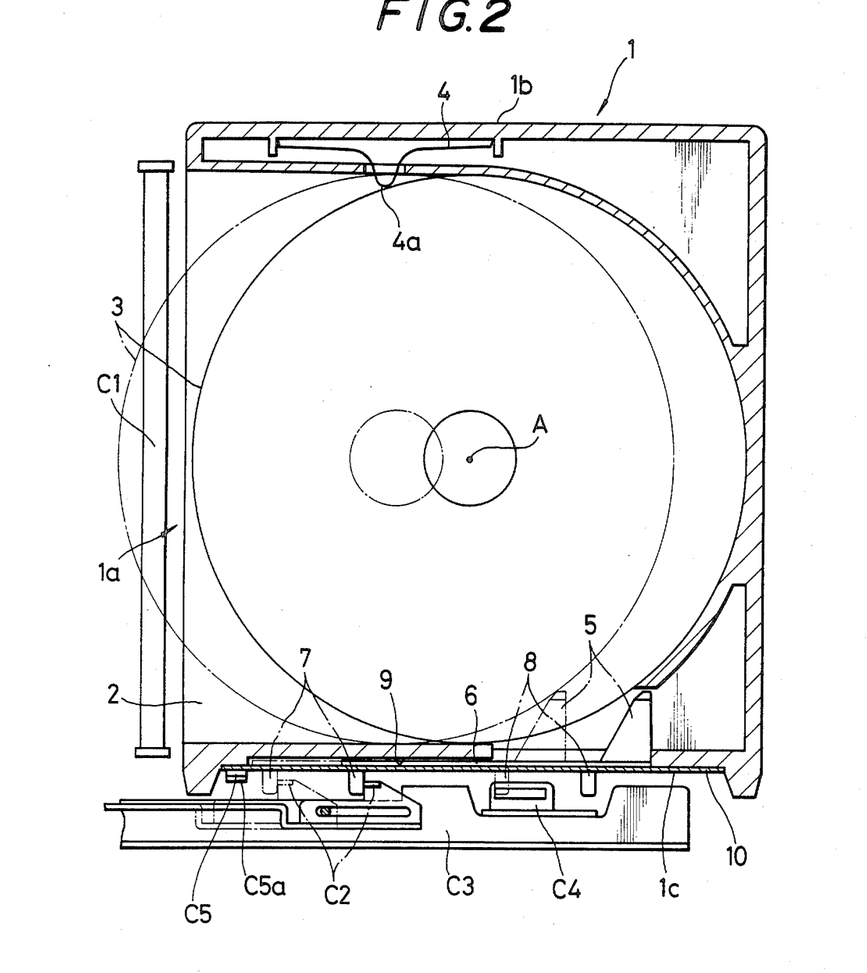
FIG. 2 is a plan sectional view of the cartridge.

As shown in FIG. 2, a slide actuation type push member 5 is slidably provided in each disk storage to outwardly push the disk 3.

The push member 5 is connected with a slide tab 7 for operation outside the cartridge through a slide member (a slide plate 6) supported by the cartridge body.

Click locking engaging portions (a projection 12b and a projection 13) are provided to the above slide portion and the cartridge body, respectively, to temporarily lock the above slide tab at a storage position at one end of a sliding direction.

The engaging portions of slide tabs 7 aligned along a vertical direction of the disk storage spaces are offset from each other by a small distance dx between the stages along the sliding direction.

In an auto changer player, a click locking load does not instantaneously act on an aligning mechanism for aligning all the slide tabs at one end.

DETAILED DESCRIPTION OF THE EMBODIMENT

FIG. 1 is a perspective view wherein the present invention is applied to a disk cartridge for charging digital audio disks. The front surface of a box-like case 1 serves as a disk insertion opening 1a. The interior of the case 1 is partitioned by partition plates 2 into a number of intervals each capable of receiving a disk, so that disks 3 are charged in storage spaces defined by the partition plates 2 as, e.g., 10 layers (stages).

FIG. 2 is a plan sectional view of one layer and also shows a part of an auto changing mechanism of a player. A leaf spring 4 is fixed at its both ends to an inner surface of a side surface 1b, and a convex portion 4a at a center of the leaf spring 4 biases the disk 3 against a side 1c opposite the side surface 1b. A line of action across the convex portion 4a of the leaf spring 4 is deviated slightly toward a discharge side (a side of the disk insertion opening 1a) from a center A of the disk 3, so that the disk 3 is held at a predetermined position unless pushed out against the biasing force of the leaf spring 4.

Push members 5 for pushing peripheral edges of the disks 3 toward the disk insertion opening 1a are provided to the side surface 1c of the case 1. Each push member 5 is connected with a slide tab 7 extending outwardly from the case 1 through a slide plate 6 slidably held to the side surface 1c. By operating the slide tab 7, the disk 3 charged in the case 1 is pushed at its peripheral edge by the push member 5 so as to be discharged outside the case 1. The partially discharged disk 3 is then sent to a load position of a player by a pair of load rollers C1 of a changing mechanism of the player.

In the changing mechanism, the slide tab 7 is operated by a pawl C2 which is engaged with the slide tab 7. The pawl C2 is slidably provided to a drive plate C3 and is operated in a disk discharge direction to hook the slide tab 7 so as to discharge the disk 3. The pawl 2 is possible to reciprocate in charge/discharge directions, and the drive plate C3 movable upward or downward along a vertical direction of a disk storage portion by a drive mechanism (not shown) is moved and positioned at a disk to be discharged by the above drive mechanism in accordance with a disk selection signal from the player.

Detection tabs 8 extending outwardly from the case 1 are additionally arranged on the slide plates 6 having the slide tabs 7 projecting thereon. Each detection tab 8 is provided to detect a return position of the disk 3 at the end of disk playback, and a limit switch C4 serving as a sensor for detecting the return position is provided to the drive plate C3 of the change mechanism. The slide tab 7 at a storage position corresponding to the disk 3 discharged for playback is located at a discharge position indicated by an alternate long and short dashed line in FIG. 2 when the disk is discharged, and at the same time the detection tab 8 is also moved to the position indicated by the above line. At the end of disk playback, when the drive plate C3 is moved upward as the disk 3 is unloaded, the limit switch C4 detects the detection tab 8 at the discharge position, and the movement of the drive plate C3 is stopped thereat. The load rollers C1 are then rotated in the opposite direction to push the disk 3 into the storage position again. The push member 5, the slide tab 7, and the detection tab 8 are then returned to the storage position of the disk 3.

As is apparent from the above description, all the slide and detection tabs 7 and 8 must be at the storage position except during playback. However, not all the storage spaces in the case 1 store the disk 3, so the disk cartridge is sometimes mounted with the slide and detection tabs not aligned at one end, as shown in a side view of an essential portion of the disk cartridge in FIG. 3. In this state, since the drive plate C3 is not moved upward or downward normally, it is difficult to discharge or insert the disk 3, and the disk 3 may not be returned in its original position due to a detection error. To prevent this, a reset lever C5 of the changing mechanism is operated immediately after the disk cartridge is mounted so as to perform a reset operation for aligning the slide tabs 7 at one end corresponding to a complete storage position of the disk 3, as indicated by an imaginary line in FIG. 3.

Figure 4:
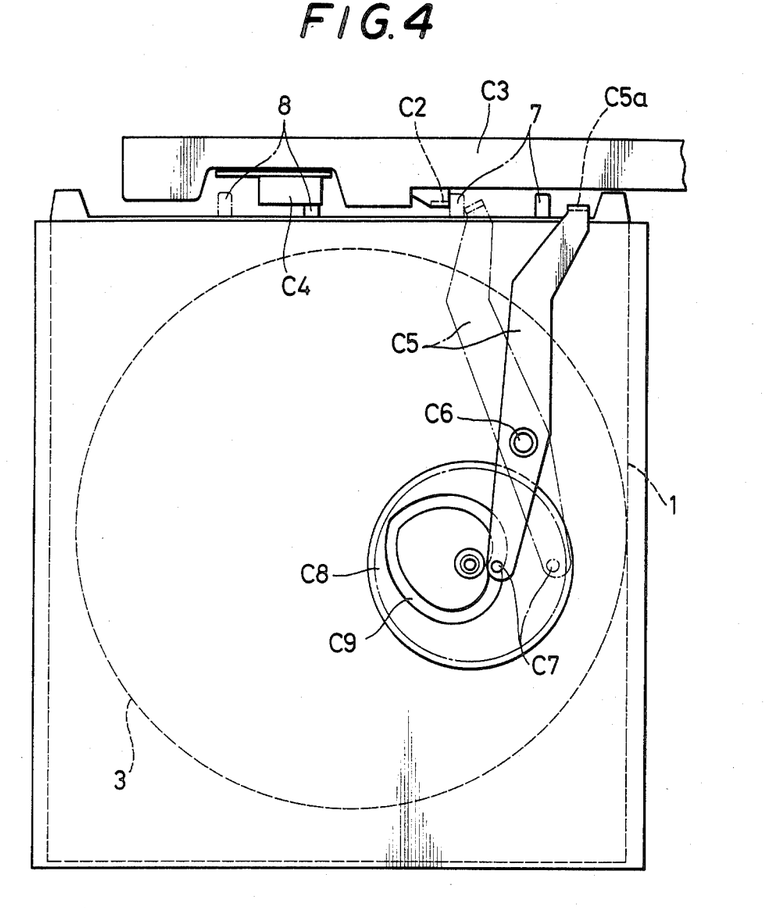
FIG. 4 is a bottom view of a changing mechanism of a player showing one example of an aligning mechanism of a slide tab for operation for pushing a disk out of the cartridge.

The reset lever C5 is, as shown in FIG. 4 which is a bottom view of an essential part of a disk cartridge mount portion of the changing mechanism, swingable about a support shaft C6, and a drive pin C7 is attached to its drive end. The drive pin C7 is fitted in a heart-shaped cam groove C9 driven by the drive mechanism (not shown). When the disk cartridge is mounted to the apparatus body, the cam disk C8 is rotated once to reciprocably swing the reset lever C5, so that the slide tabs 7 are aligned at one end by an actuation edge C5a of the reset lever C5.

Although the slide and detection tabs 7 and 8 are aligned at one end, since they are not externally locked, the positions of the slide tabs 7 are varied by the vibrations, acceleration, deceleration, or inclination to a player for automobile use. For this reason, a click positioning mechanism (a structure wherein a sliding load is locally increased in a fixed position) is provided to the slide plate 6 formed integrally with the slide and detection tabs 7 and 8, so that the slide tab 7 is not easily moved. However, the click mechanism causes a load to act on the reset lever C5 described above and the load is increased up to a maximum number of disks which can be charged in the cartridge, so that the large load acts on the reset mechanism of the changing mechanism. Therefore, the following specific arrangement is provided so as not to increase the load by the click mechanism.

Figure 5:
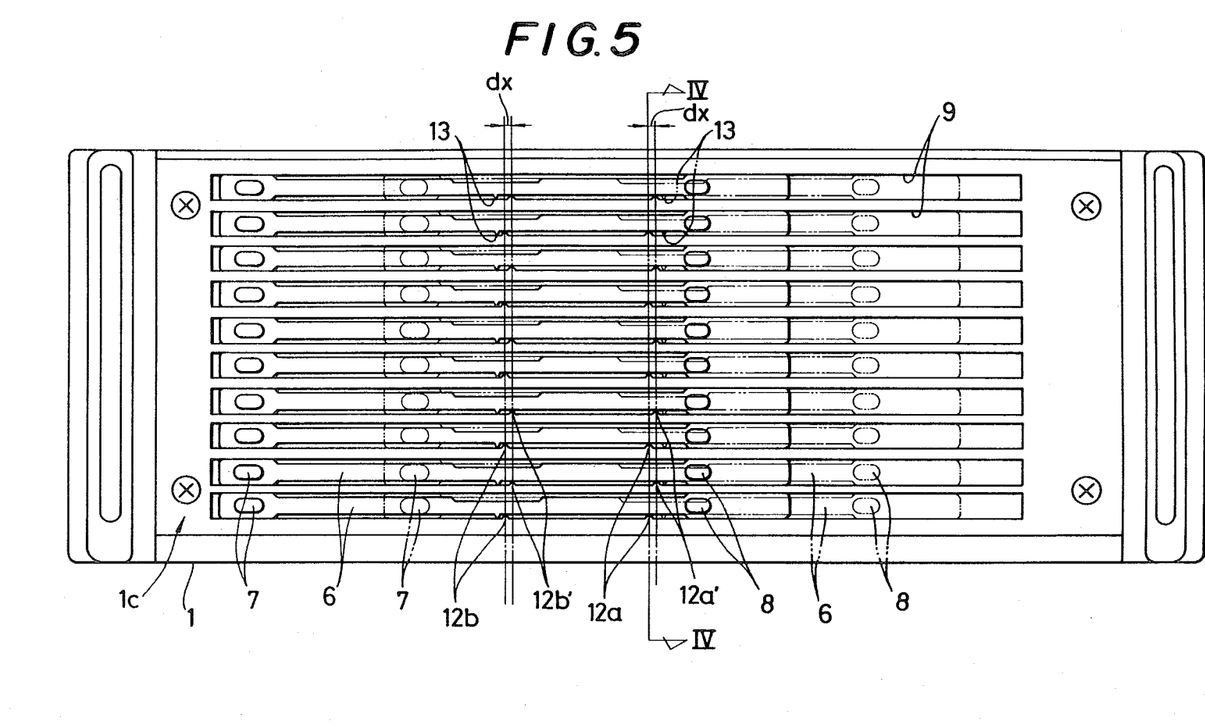
FIG. 5 is a side view showing the cartridge in detail.
Figures 6, 7:
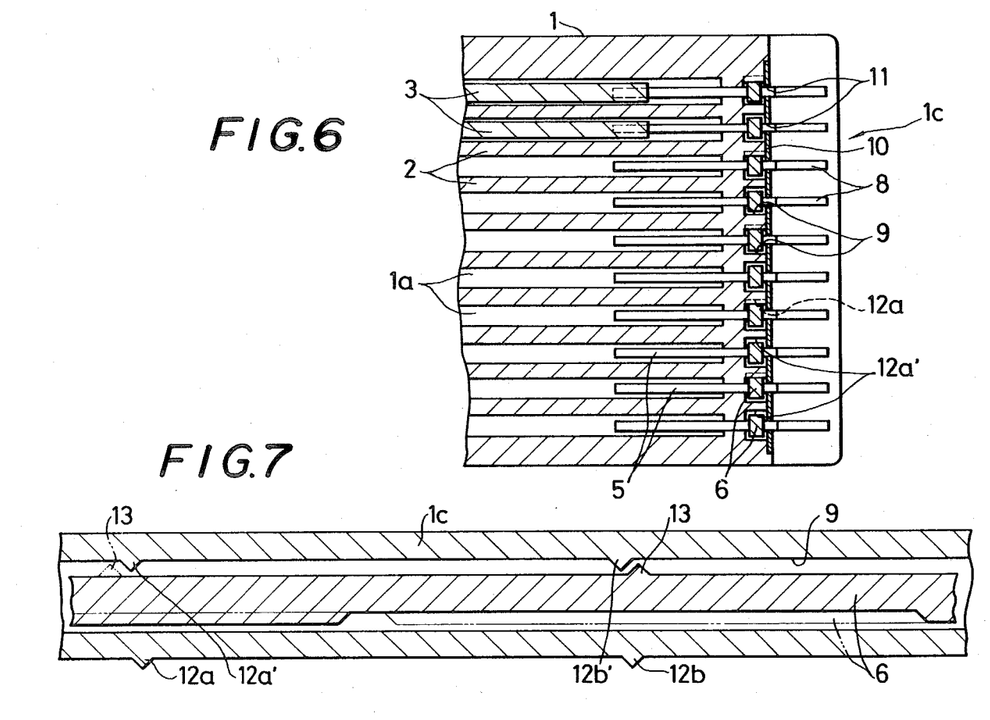
FIG. 6 is a cross-sectional view of FIG. 5.
FIG. 7 is a sectional view showing a slide plate and a slide groove in detail.

FIG. 5 is a side view of the case 1, and FIG. 6 is a sectional view of an essential part thereof. Each slide plate 6 is slidably fitted in the corresponding slide groove 9 formed at the height of the disk of the side surface 1c of the case 1 and prevented from being removed by covering a side plate 10. The slide and detection tabs 7 and 8 extend outside the side surface 1c through slits 11 of the side plate 10.

Substantially V-shaped two small projections 12a and 12b respectively corresponding to the disk charge and discharge positions are provided on an inner surface of the slide groove 9. On the other hand, a single substantially V-shaped projection 13 is provided on the opposite surface of the slide plate 6. As shown in detail in FIG. 7, a position at which the projection 13 at the sliding side is moved to the right over the fixed projection 12b corresponds to the disk storage position, and the slide tab 7 is not easily offset from this position to the left in a discharging direction. A position at which the projection 13 at the sliding side is moved to the left over the projection 12a at the fixed position corresponds to the disk discharge position, and the slide tab 7 is not easily offset from this position to the right (in a charging direction). The maximum amount of movement in the right and left directions of the slide tab 7 is limited by the slit 11.

Since a click resistance is generated by a flexure of the slide plate 6 occurring when the projection 13 is moved over the projections 12a and 12b, a suitable amount of clearance capable of absorbing the above flexure is provided between the slide plate 6 and the slide groove 9.

When all the slide tabs 7 are aligned by the reset lever C5 and a click resistance thereof simultaneously serves as a load of the reset lever C5, a motor or the like for the reset lever C5 is overloaded. Therefore, as shown in FIG. 5, the projections 12a and 12b of every other slide grooves 9 are offset from the projections 12a' and 12b' of the remaining every other slide grooves 9 by dx. With this arrangement, a resistance simultaneously acting on the reset lever C5 when the projection 13 is moved over the projection 12a or 12b is reduced to only ½ of that of all the stages. Accordingly, a load of the drive motor for the reset lever C5 is greatly decreased.

Figure 3:
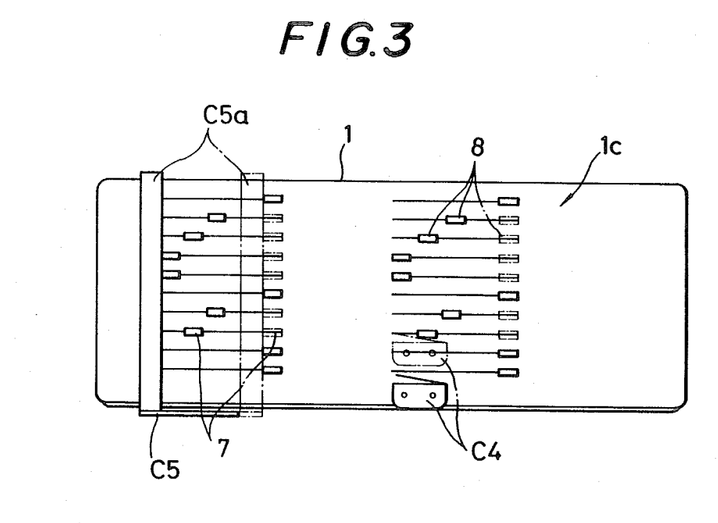
FIG. 3 is a side view of the cartridge.
Figure 8:
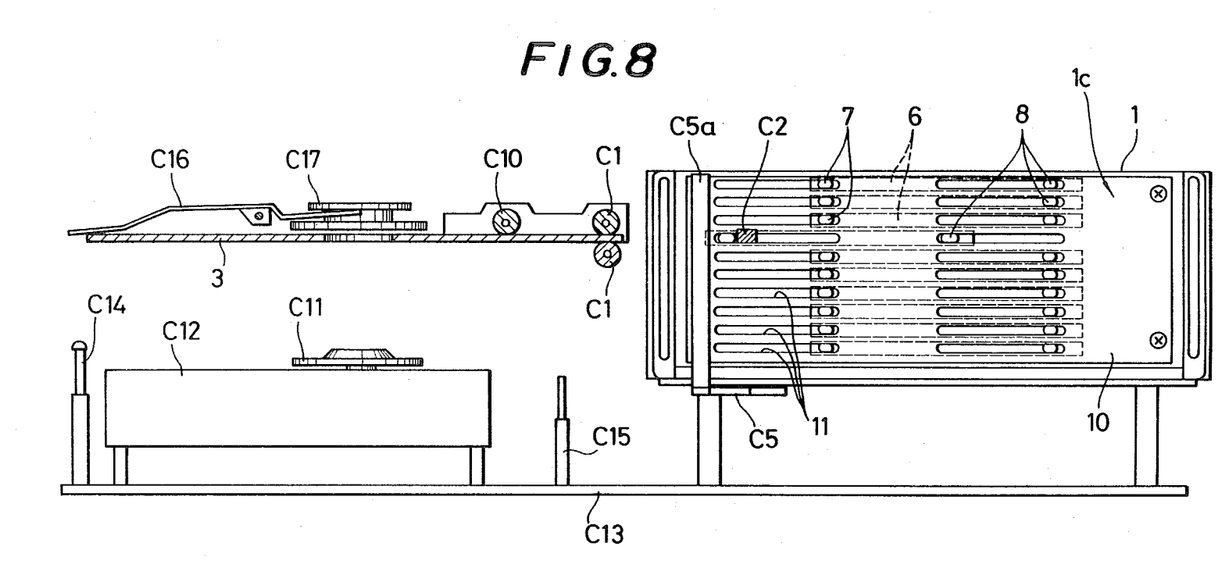
FIGS. 8 and 9 are schematic side views of an auto change player showing a disk loading operation.
Figure 9:
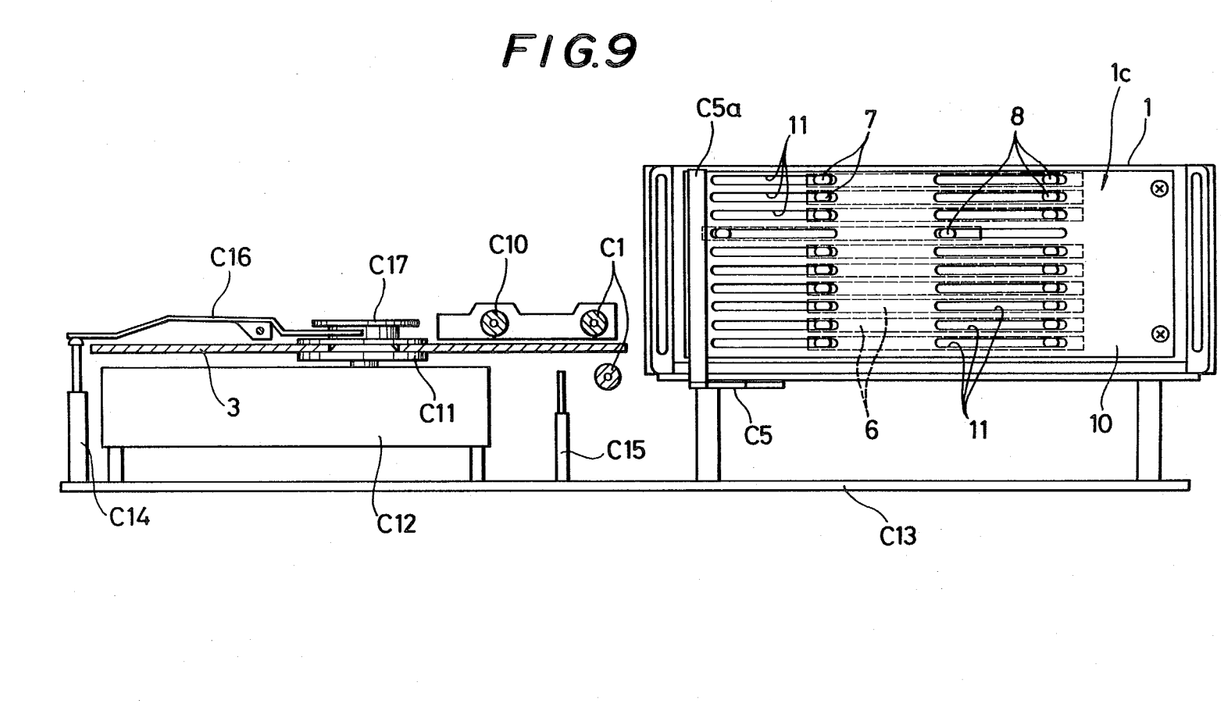

FIGS. 8 and 9 are side views of an essential part showing an operation of the changing mechanism of the player. As previously described, when the case 1 of the disk cartridge is mounted to the mount portion of the changing mechanism, the slide tabs 7 are aligned at one end by the reset lever C5, as shown in FIG. 3. Then, a disk selection operation is performed, and the drive plate C3 in FIG. 2 is positioned at the height of the selected disk stage of the cartridge. Thereafter, the pawl C2 provided to the drive plate C3 in FIG. 2 is moved in a removal direction to operate one of the slide tabs 7. Thus, the disk 3 is pushed from the front surface 1a of the case 1 and then discharged to a position in FIG. 8 by the pair of load rollers C1 and guide roller C10.

Subsequently, the drive plate C3 is moved downward, and the disk 3 is loaded on a turntable C11 on a player C12, as shown in FIG. 9. At this time, the load rollers C1 and the guide roller C10 are removed from the disk 3 by stoppers C14 and C15 extending from a fixed chassis C13, and a clamp arm C16 provided on the drive plate C5 is moved downward, so that a disk clamper 17 is set free to fix the disk 3 on the turntable C11 by its magnetic attraction force.

An operation opposite to that described above is performed at the end of playback. More specifically, the drive plate C3 is lifted, and the limit switch C4 on the drive plate C3 shown in FIGS. 2 and 3 detects the detection tab 8 at the discharge position. Upon this detection, the drive plate C3 is stopped at the height of the disk storage position. The load rollers C1 are then rotated in the opposite direction to push the disk 3 into its original storage position of the disk cartridge, thereby completing a series of operation.

Note that in the above embodiment, the projections 12a (12b) of the every other slide grooves 9 are offset from the projections 12a' (12b') of the corresponding adjacent slide grooves 9 along a sliding direction by the distance dx. However, the storage stages may be offset for every third storage stages, or they may be divided into upper and lower stages so that the upper stages are offset from the lower stages. Also all the storage stages may be offset from one another. In addition, only the projection 12b at the storage position is provided and the projection 12a at the removal position may be omitted as long as the pawl C2 at the side of the changing mechanism has a function to prevent the slide tab 7 from being moved to the right (along an inactive direction) at the discharge position.

In the above embodiment, click locking of the projections 12a and 12b with respect to the projection 13 is used, but click locking by projections and recesses engagement may be used.

The present invention has been described with reference to a disk cartridge for housing digital audio disks. However, the present invention is not limited to the above embodiment but can be applied to a disk-like medium such as a video disk, a magnetic disk, or the like and independent of a recording or reproducing system.

As has been described above, in the present invention, since click engaging portions for temporarily locking slide tabs for disk discharge at one end are provided, the slide tabs are not offset by an external force such as vibrations, so that a detection mechanism for detecting a disk discharge stage is not erroneously operated at the side of the auto changer player. In addition, a click locking load of all the slide tabs does not simultaneously act on an aligning mechanism, so that driving power of the aligning mechanism is reduced and an apparatus can be light in weight and small in size.

What is claimed is:

1. A disk cartridge comprising:
    a disk cartridge body for charging therein a plurality of disks so that the disks are stacked by shelf-like partitions;
    biasing means, provided inside the disk cartridge body, for biasing the disk to be stored in a storage direction; and
    a plurality of slide members, each having a projecting portion projecting outwardly from a side surface of said disk cartridge body and a push portion for pushing the stored disk in a discharging direction, and slidably provided along discharge and storage directions of the stored disk, for discharging or charging the disk to be stored against a biasing force of said biasing means upon operation of said projecting portion,
    wherein click locking engaging portions each consisting of an engaging portion provided to either of said disk cartridge body or said slide member and an corresponding engaging portion provided to the other are formed at a position where said slide member is temporarily locked at the disk storage position.

2. A disk cartridge according to claim 1, wherein said click locking engaging portions are offset by a predetermined amount along a sliding direction of said slide members between disk storage spaces formed by said partitions.

3. A disk cartridge according to claim 2, wherein said engaging portion or said corresponding engaging portion, for constituting said click locking engaging portion, is provided at the disk discharge position to lock said slide member thereat.

4. A disk cartridge according to claim 1, wherein detection portions, each projecting outwardly from a side surface of said disk cartridge, for detecting the disk returning stage, are provided to said slide members.

5. A disk cartridge according to claim 4, wherein said click locking engaging portions, provided at said discharge position, are offset by a predetermined amount along a sliding direction of said slide members between said disk storage spaces.

* * * * *